United States Patent [19]

Ibe et al.

[11] Patent Number: 5,008,309

[45] Date of Patent: Apr. 16, 1991

[54] BALANCING PUTTY

[75] Inventors: Hiromitu Ibe, Kosai; Ichiro Akutagawa, Nagareyama; Kunimitsu Matsuzaki, Yono, all of Japan

[73] Assignees: Asmo Co., Ltd.; Somar Corporation, both of Japan

[21] Appl. No.: 340,734

[22] Filed: Apr. 20, 1989

[51] Int. Cl.$^5$ .............................. C08K 3/30; C08K 3/08
[52] U.S. Cl. .................................. 523/442; 523/443; 523/458; 523/459
[58] Field of Search ............... 523/442, 443, 458, 459; 524/434

[56] References Cited

U.S. PATENT DOCUMENTS 4,081,423  3/1978  Hardenfelt ........................... 523/442
4,559,373  12/1985  Guthrie et al. ........................ 523/458

*Primary Examiner*—Lewis T. Jacobs
*Attorney, Agent, or Firm*—Lorusso & Loud

[57] ABSTRACT

A balancing putty for use in balancing rotation of a rotary part including:
(a) an epoxy resin;
(b) a curing agent capable of curing the epoxy resin when heated at a temperature of 60° C. or more,
(c) a first, finely divided inorganic filler having a specific gravity of 4.0 g/cm$^3$ or more; and
(d) a second, finely divided inorganic filler having a specific gravity of less than 4.0 g/cm$^3$, the balancing putty having a density of at least 2.0 g/cm$^3$ and a consistency of 1–12 mm in terms of penetration.

8 Claims, No Drawings

BALANCING PUTTY

This invention relates generally to a balancing material to be applied to a rotary part, such as a rotor of a motor, for providing well-balanced rotation.

Motors such as small-sized precision motors are required to rotate not only at a constant rate but also in a well-balanced, stable condition. For the purpose of obtaining good dynamic balance in a rotor of a motor relative to the rotation axis thereof, it is known to apply a thermocurable paste to a suitable position of the rotor.

One known balancing material is a paste having a viscosity of 3000 poise (25° C.) and composed of 100 parts of an epoxy resin, 6 parts of dicyanodiamide, 200 parts of alumina, 8 parts of a thixotropy-imparting agent and 3 parts of imidazole. Another balancing material is also known which is a paste having a viscosity of 3500 poise (25° C.) and composed of 100 parts of an epoxy resin, 20 parts of adipohydrazide, 150 parts of alumina and 3 parts of a thixotropy-imparting agent. These pastes, in use, are applied onto a surface of a rotor for balancing, and are then heated for curing and fixing.

The known balancing materials have, however, a problem since the shape of the balancing materials as applied is easily changed during the balancing or curing treatment. Therefore, it is very difficult to retain well balanced conditions until the curing is completed. Another problem of the conventional balancing materials is that it is necessary to use them in a relatively large amount, because of their low density of less than 2.0 g/cm$^3$. This is especially disadvantageous when they are to be used for balancing rotors of micromotors.

The present invention has been made with the foregoing problems of the known balancing materials in view. In accordance with the present invention there is provided a balancing putty comprising:

(a) an epoxy resin;

(b) a curing agent capable of curing the epoxy resin when heated at a temperature of 60° C. or more, (c) a first, finely divided inorganic filler having a specific gravity of 4.0 g/cm$^3$ or more; and (d) a second, finely divided inorganic filler having a specific gravity of less than 4.0 g/cm$^3$, said balancing putty having a density of at least 2.0 g/cm$^3$ and a consistency of 1–12 mm in terms of penetration.

The term "consistency" used herein is intended to refer to penetration measured in accordance with Japanese Industrial Standard JIS K2220-1980 using a penetrometer. Namely, a cone needle weighing 102.5±0.05 g is placed on a sample for at 25° C. for 5 seconds to measure the penetration depth (mm) of the needle.

Any known epoxy resin having at least two epoxy groups in its polymer molecule may be used for the purpose of the present invention. Illustrative of suitable epoxy resins are Bisphenol A-type epoxy resins, hydrated Bisphenol A-type epoxy resins, Bisphenol AD-type epoxy resins, Bisphenol F-type epoxy resins, carboxylic acid glycidyl ester-type epoxy resins, phenol novolak-type epoxy resins and urethane-modified Bisphenol A-type epoxy resins. These epoxy resins may be used singly or in the form of a mixture. It is preferable to use an epoxy resin which is liquid at room temperature. A solid epoxy resin may also be used by dissolving it in a liquid epoxy resin. In such a case, the amount of solid epoxy resin is desired to be in the range of 5–40% by weight based on the total weight of the epoxy resins.

As the curing agent to be used in conjunction with the epoxy resin, it is important that the curing agent should not react with the epoxy resin at room temperature but can react therewith at a temperature of at least 60° C., preferably at least 100° C. By using such a "latent" curing agent, the resulting thermocurable composition can exhibit a long pot life and excellent preservability.

Such latent curing agents may be, for example, a boron trifluoride-amine complex, an organometallic compound, an acid anhydride, a phenol compound, a novolak phenol resin or a nitrogen-containing compound. Of these, the use of a nitrogen-containing compound is especially preferred. Illustrative of suitable nitrogen compounds are guanamines such as acetoguanamine and benzoguanamine; carboxylic acid hydrazides such as adipodihydrazide, succinohydrazide, stearohydrazide, p-oxybenzohydrazide, isophthalohydrazide and sebacohydrazide; triazine compounds such as 2,4-dihydrazide-6-methylamino-S-triazine and 2,4-diamino-6-2-methylimidazolyl-(1)-ethyl-S-triazine; imidazole compounds such as 2-heptadecylimidazole, 2-phenyl-4,5-dihydroxymethylimidazole and 2-phenyl-4-methyl-5-hydroxymethylimidazole; and amine adducts such as disclosed in Japanese Unexamined patent application No. 60-4524.

Especially preferred nitrogen-containing compounds are adducts obtained by reacting a compound having at least two epoxy groups with a compound having both a hydroxyl group and a tertiary amino group and with an organic compound (except those having an epoxy group or a tertiary amino group) having at least two active hydrogen atoms. Examples of such adducts are polyaddition reaction products obtained from (i) 2,3-bis{4-(2,3-epoxypropoxy)phenyl}propane, 1,3-bis{4-[4-(2,3-epoxypropoxy)-α,α-dimethylbenzyl]phenoxy}-2-propanol, (ii) condensation products obtained from phenol, formaldehyde and dimethylamine, (iii) adducts of 2-alkyl(with 1–3 carbon atoms)imidazole or 2-alkyl(-with 1–3 carbon atoms)-4-methylimidazole and 2,3-epoxypropyl phenyl ether and (iv) piperazine.

The above-described curing agents, especially the nitrogen-containing curing agents are suitably used in conjunction with a curing promoter. Examples of the curing promoters are as follows:

(1) a solid solution containing 1,8-diaza-bicyclo(5,4,0)-undecene-7 and a phenol novolak and obtained by heating a mixture containing the both components, followed by solidification and pulverization (The phenol novolak is a condensation product obtained from a phenol compound and an aldehyde. The phenol compound may be phenol, alkylphenol, alkoxyphenol, halogenated phenol and other mono or polyhydroxyl phenols such as resolsinol and Bisphenol A. Preferred phenol compounds are phenol, p-tert-butylphenol and Bisphenol A. The aldehyde may be furfuraldehyde, chloral, acetoaldehyde and formaldehyde. The both components of the solid solution is not necessarily in the form of a salt. The content of the undecene-7 in the solid solution may be 10–50% by weight.);

(2) urea derivatives such as 3-(3,4-dichlorophenyl)-1,1-dimethylurea; and (3) imidazole and its derivatives and modified products thereof. The amine adducts as described above can also be used as the curing promoter.

The amount of the nitrogen-containing curing agent in the balancing putty according to the present invention is preferably 0.03–0.25 mole per one epoxy equivalent of the epoxy resin. Too low an amount of the curing agent tends to cause the lowering of the glass transition point and moisture resistance of the resulting cured product and the reduction of the curing rate. On the other hand, too large an amount of the curing agent tends to cause the reduction of preservability of the resulting balancing putty.

The amount of the curing promoter is generally 1-30 parts by weight per 100 parts by weight of the epoxy resin. Too low an amount of the promoter is ineffective to accelerate the curing. No additional merit is obtainable from the use of the curing promoter in an excess amount. Rather, the preservability of the balancing putty is deteriorated when the promoter is used in an excess amount.

The balancing putty according to the present invention contains two kinds of finely divided inorganic fillers, i.e. a first filler having a specific gravity of 4.0 g/cm$^3$ or more, preferably 4.5 g/cm$^3$ or more and a second filler having a specific gravity of less than 4.0 g/cm$^3$, preferably 1.5-3.8 g/cm$^3$. By this, the putty is imparted with an improved homogeneity and an improved processability in balancing works. Further, it becomes easy to adjust the density and shape-retentivity of the putty to desired degrees.

The first filler may be, for example, metal powder such as of zinc, tin, iron, lead, copper or manganese, and powder of metal compounds such as barium sulfate, lead sulfate, lead carbonate, lead phosphate, lead phosphite, zinc oxide, copper oxide, iron oxide, zirconium oxide, lead oxide and antimony trioxide. The use of metallic lead powder, lead compound powder, barium sulfate powder or a mixture thereof is particularly preferred. When metallic lead powder is used, it is preferable to additionally use a lead compound or barium sulfate in combination so as to improve tackiness of the putty. The powder preferably has an average particle size of 0.2-10 μm, more preferably 0.5-5 μm.

The second filler is used for the purpose of maintaining the homogeneity of the putty during storage and of improving the shape-retentivity of the putty when applied on the surface of a rotary member to be balanced. The second filler also makes it easy to adjust the density of the putty to a desired value. Any inorganic powder may be used as the second filler as long as it has a specific gravity of less than 4.0 g/cm$^3$. It is preferable, however, to use as the second filler an inorganic thixotropic agent for reasons of its excellent ability to improve shape-retentivity of the putty. Examples of such thixotropy-imparting substances include super fine silica or alumina having an average particle size of 0.1 μm or less, aluminum hydroxide powder having an average particle size of 3 μm or less, fibrous magnesium oxysulfate, fibrous silica, fibrous potassium titanate, scale-like mica and bentonite (montmorillonite-organic base composite). The thixotropic agent preferably has an average particle size of 10 μm or less.

Generally, balancing operation is carried out with an automatic balancing device in which the amount of the putty to be applied is calculated on a volume basis. Therefore, it is desirable that the putty be homogeneous and uniform. The second filler serves to prevent the occurrence of the sedimentation or separation of the first filler. For the purpose of effectively obtaining such a homogeneity improving effect, it is preferred that the thixotropy-imparting substance be used in conjunction with a homogeneity improving substance having an average diameter of 0.3-20 μm, more preferably 0.5-10 μm. Illustrative of suitable homogeneity improving substances are aluminum oxide, magnesium oxide, silicon oxide, calcium carbonate, magnesium carbonate, mica, clay or sepiolite.

If desired, a polyalkylene glycol such as a polyethylene glycol or a polypropylene glycol, preferably having a molecular weight of 200-1000, may be used in combination with the thixotropy-improving substance for further improving the thixotropy-improving effect. The polyalkylene glycol may be used in an amount of 0.5-10 parts by weight per 100 parts by weight of the epoxy resin. An amount of the glycol below 0.5 part is insufficient to obtain thixotropy improving effect. Too high a content of the glycol in excess of 10 parts will cause the reduction of heat resistance of the resulting cured putty.

The balancing putty of the present invention may further contain other additive or additives such as a diluent, a flame-retarding agent and a colorant.

The proportion of the above-described ingredients in the putty is not specifically limited as long as the resulting putty has such a density and a consistency as specified later. Generally, however, the curing agent is used in an amount of 1-40 parts by weight, preferably 3-30 parts by weight, per 100 parts by weight of the epoxy resin. The first filler is used in an amount of 100-1200 parts by weight, preferably 500-900 parts by weight per 100 parts by weight of the epoxy resin. The second filler is used in an amount of 5-300 parts by weight, preferably 15-200 parts by weight, per 100 parts by weight of the epoxy resin. The total amount of the first and second fillers is 50-95% by weight, preferably 60-90% by weight, based on the total amount of the putty. When the second filler is composed of a mixture of a homogeneity-improving substance and a thixotropy-imparting substance, the amount of the former substance is preferably not greater than 20 times, more preferably not greater than 10 times the weight of the latter substance.

It is important that the balancing putty according to the present invention have a density of 2.0 g/cm$^3$ or more, preferably 2.2 g/cm$^3$ or more and a consistency, in terms of penetration, of 1-12 mm, preferably 3-8 mm. When the penetration exceeds 12 mm, the putty becomes fluid and loses shape-retentivity. retentivity. On the other hand, a penetration of the putty below 1 mm causes loss of tackiness or adhesiveness thereof.

The putty of the present invention is thermocurable and preferably has a gellation time (as specified in JIS C2105) at 150° C. of 15-200 seconds, more preferably 20-150 seconds.

In use, the putty is manually or automatically, with a suitable dispenser, applied onto a suitable portion, such as a coil end of a rotor, in an amount suitable to provide well-balanced rotation. Then the rotor to which the putty has been applied is heated with, for example, a furnace to 130°-170° C. to permit the curing of the putty. Since the putty has a good shape-retentivity, the dynamic balance once given to the rotor by application of the putty is not lost when the putty is cured. Further, since the balancing putty has relatively a high density, a small amount of the putty can be effective for balancing, ensuring easy balancing work and good appearance of the rotary parts. In addition, the putty has good adhesiveness and high resistance to heat, moisture and mechanical stress. Therefore, motors whose rotors have been balanced with the use of the putty according to the present invention can exhibit long service life even subjected to a high temperature of, for instance, 150° C. for a long period of time.

The following examples will further illustrate the present invention.

EXAMPLE 1

The following balancing composition in the form of a putty was prepared. The putty had a consistency (penetration) of 5.3 mm and a density of 2.3 g/cm³.

| Ingredient | Content (parts by weight) |
| --- | --- |
| Epikote 828*1 | 95 |
| Epikote 834*2 | 5 |
| Curing agent*3 | 25 |
| Barium sulfate*4 | 200 |
| Magnesium oxide*5 | 140 |
| Silica*6 | 4 |
| Mica*7 | 20 |
| Colorant*8 | 1.5 |

*1, *2: Bisphenol A-type epoxy resins (manufactured by Yuka Shell Epoxy Co., Ltd)
*3: Amine adduct (Amicure PN-23 manufactured by Aginomoto Co., Ltd.)
*4: Average particle size: 0.6 μm, Specific gravity: 4.5 g/cm³
*5: Average particle size: 3.0 μm, Specific gravity: 3.65 g/cm³
*6 Average particle size: 0.007 μm
*7 Scale-like mica with an average particle size of 8 μm
*8: Red iron oxide with an average particle size of 0.15 μm The balancing putty was applied onto an end portion of a rotor coil of a micromotor so that the rotor was rotatable in a well-balanced state at a rotation speed of 1000 rpm. During the balancing working, no deformation of the applied putty was observed. The putty had an excellent shape-retentivity. After the balancing treatment, the rotor to which the putty was applied was placed in a furnace to effect curing at 150° C. for 7 minutes. Then, the rotor was attached to the motor body and the motor was driven at 150° C. for 1 minute at a revolution speed of 10000 rpm. The rotor showed well-balanced revolution. Further, no cracks were formed in the cured putty. The cured putty was found to firmly bond to the rotor.

Similar test was conducted again after storing the putty at room temperature for 1 month. The same results as those of before storage were obtained.

EXAMPLE 2

The following balancing composition in the form of a putty was prepared. The putty had a consistency (penetration) of 6.2 mm and a density of 4.5 g/cm³.

| Ingredient | Content (parts by weight) |
| --- | --- |
| Epikote 828* | 70 |
| Epikote 834* | 30 |
| Dicyanodiamide | 8 |
| 3-(3,4-Dichlorophenyl)-1,1-dimethylurea | 8 |
| Metallic lead powder | 600 |
| Barium sulfate* | 50 |
| Magnesium oxide* | 20 |
| Silica* | 5 |
| Mica* | 20 |
| Colorant* | 5 |

*The same substance as used in Example 1.

The above balancing putty was subjected to the same tests as those in Example 1. As a result, it was found that the putty had excellent properties similar to that of Example 1. Even after storage for 1 month, the putty still exhibited excellent properties.

EXAMPLE 3

The following balancing composition in the form of a putty was prepared. The putty had a consistency (penetration) of 6.0 mm and a density of 5.0 g/cm³.

| Ingredient | Content (parts by weight) |
| --- | --- |
| Epikote 828 | 30 |
| Epikote 807 | 60 |
| Epikote 834 | 10 |
| Dicyanodiamide | 5 |
| 3-(3,4-Dichlorophenyl)-1,1-dimethylurea | 6 |
| Adipohydrazide | 22 |
| Metallic lead powder | 430 |
| Red lead | 450 |
| Mica | 55 |

The above balancing putty was subjected to the same tests as those in Example 1. As a result, it was found that the putty had excellent properties similar to that of Example 1. Even after storage for 1 month, the putty still exhibited excellent properties.

EXAMPLE 4

Into a 200 ml three-necked flask equipped with a reflux condenser and a stirrer, 11.6 g of 1-(2-hydroxy-3-phenoxypropyl)-2-methylimidazole, 2.65 g of 2,4,6-tris(dimethylaminomethyl)phenol, 4.3 g of piperazine and 50 ml of methyl ethyl ketone as a solvent were placed, to which was added dropwise a solution of 19 g of Epicoat 828 (Bisphenol A diglycidyl ether) in 30 ml methyl ethyl ketone for 30 minutes. The mixture was then reacted under reflux condition at 100° C. for 2 hours. After completion of the reaction, the reaction mixture was distilled under a reduced pressure to remove methyl ethyl ketone, thereby to leave a product which was light yellow solid at room temperature.

Example 1 was repeated in the same manner as described except that the above product was used as the curing agent in place of Amicure PN-23. Similar results were obtained.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A balancing putty comprising:
   (a) an epoxy resin;
   (b) a curing agent capable of curing the epoxy resin when heated at a temperature of 60° C. or more,
   (c) a first, finely divided inorganic filler having a specific gravity of 4.0 g/cm³ or more; and
   (d) a second, finely divided inorganic filler comprising a thixotropic agent having a specific gravity of less than 4.0 g/cm³, said balancing putty having a density of at least 2.0 g/cm³ and a consistency of 1-12 mm in terms of penetration.

2. A balancing putty as claimed in claim 1, wherein said first filler is selected from the group consisting of metallic lead, lead compounds, barium sulfate and mixtures thereof.

3. A balancing putty as claimed in claim 1, wherein said first filler is a mixture of metallic lead and barium sulfate or red lead.

4. A balancing putty as claimed in claim 1, wherein said thixotropic agent has an average particle size of 10 μm or less.

5. A balancing putty as claimed in claim 4, wherein said thixotropic agent is selected from the group consisting of silica having an average particle size of 0.1 μm or less, alumina having an average particle size of 0.1 μm or less, aluminum hydroxide powder having an average particle size of 3 μm or less, fibrous magnesium oxysulfate, fibrous silica, fibrous potassium titanate, scale-like mica and bentonite.

6. A balancing putty as claimed in claim 5, wherein said second filler further includes a homogeneity improving substance having an average diameter of 0.3–20 μm and selected from aluminum oxide, magnesium oxide, silicon oxide, calcium carbonate, magnesium carbonate, clay or sepiolite.

7. A balancing putty as claimed in claim 1, and having a density of 2.2–5.5 g/cm$^3$ and a consistency of 3–8 mm.

8. A balancing putty as claimed in claim 1, wherein said curing agent is an addition product obtained by reaction of (i) 2,3-bis{4-(2,3-epoxypropoxy)phenyl}propane or 1,3-bis{4-[4-(2,3-epoxypropoxy)-α,α-dimethylbenzyl]phenoxy}-2-propanol, (ii) a condensation product obtained from phenol, formaldehyde and dimethylamine, (iii) an adduct of 2-alkyl(with 1–3 carbon atoms) imidazole or 2-alkyl (with 1–3 carbon atoms)-4-methylimidazole and 2,3-epoxypropyl phenyl ether and (iv) piperazine.

* * * * *